(12) United States Patent
Guillemot et al.

(10) Patent No.: US 11,419,187 B2
(45) Date of Patent: Aug. 16, 2022

(54) GLASS-CERAMIC ARTICLE AND MANUFACTURING PROCESS

(71) Applicant: EUROKERA S.N.C., Chateau-Thierry (FR)

(72) Inventors: Francois Guillemot, Paris (FR); Nicolas Chemin, Bagneux (FR); Nathalie Diaz, Paris (FR); Pablo Vilato, Paris (FR)

(73) Assignee: EUROKERA S.N.C., Chateau-Thierry (FR)

( * ) Notice: Subject to any disclaimer, the term of this patent is extended or adjusted under 35 U.S.C. 154(b) by 1463 days.

(21) Appl. No.: 14/404,677

(22) PCT Filed: Jun. 18, 2013

(86) PCT No.: PCT/FR2013/051419
§ 371 (c)(1),
(2) Date: Dec. 1, 2014

(87) PCT Pub. No.: WO2013/190230
PCT Pub. Date: Dec. 27, 2013

(65) Prior Publication Data
US 2015/0144613 A1    May 28, 2015

(30) Foreign Application Priority Data

Jun. 21, 2012 (FR) ..................... 12 55823

(51) Int. Cl.
*H05B 3/74* (2006.01)
*C03C 17/00* (2006.01)
(Continued)

(52) U.S. Cl.
CPC ............ *H05B 3/74* (2013.01); *C03C 17/009* (2013.01); *C03C 17/02* (2013.01); *H05B 3/688* (2013.01);
(Continued)

(58) Field of Classification Search
CPC ... C03C 17/02; C03C 17/009; C03C 2217/77; C03C 2218/113; C03C 2218/335; H05B 3/688; H05B 3/74; Y10T 428/24355
(Continued)

(56) References Cited

U.S. PATENT DOCUMENTS 2,668,783 A * 2/1954 Migley ................... C03C 17/02
428/410
3,208,874 A * 9/1965 Conner, Jr. ............. C23C 26/00
428/471
(Continued)

FOREIGN PATENT DOCUMENTS

| WO | 01/74739 A1 | 10/2001 |
|---|---|---|
| WO | 2010/131057 A2 | 11/2010 |
| WO | 2011/085997 A1 | 7/2011 |

OTHER PUBLICATIONS

WO2011085997A1 Machine Translation; Henze, Inka; Method for Producing a Disk with a Structured Surface, and Disk with a Structured Surface; Jul. 21, 2011.*

(Continued)

*Primary Examiner* — Eric S Stapleton
(74) *Attorney, Agent, or Firm* — Element IP, PLC

(57) ABSTRACT

The present invention relates to an article comprising at least one glass-ceramic substrate, in particular a plate, intended, for example, to cover or receive at least one heating element, said substrate exhibiting, in at least one zone, a surface roughness such that the characteristic dimensions of the patterns forming said roughness are between 2 and 100 μm. The present invention also relates to an advantageous process for producing said substrate.

11 Claims, 3 Drawing Sheets

(51) Int. Cl.
*H05B 3/68* (2006.01)
*C03C 17/02* (2006.01)

(52) U.S. Cl.
CPC .... *C03C 2217/77* (2013.01); *C03C 2218/113* (2013.01); *C03C 2218/335* (2013.01); *Y10T 428/24355* (2015.01)

(58) Field of Classification Search
USPC .................. 219/460.1; 264/134; 428/141
See application file for complete search history.

(56) References Cited

U.S. PATENT DOCUMENTS

| | | | | |
|---|---|---|---|---|
| 5,504,646 | A * | 4/1996 | Tanaka | G11B 5/6005 360/133 |
| 5,597,644 | A * | 1/1997 | Araki | B82Y 25/00 156/89.16 |
| 5,750,230 | A * | 5/1998 | Ishikawa | G11B 5/66 428/848.2 |
| 5,766,680 | A * | 6/1998 | Schmidt | C03C 1/008 427/226 |
| 5,855,998 | A * | 1/1999 | Tanabe | B24B 37/107 428/216 |
| 6,463,760 | B1 * | 10/2002 | Fink-Straube | G02B 1/10 65/17.2 |
| 6,465,763 | B1 * | 10/2002 | Ito | H01L 21/67109 219/444.1 |
| 6,553,788 | B1 * | 4/2003 | Ikeda | C03C 15/00 216/100 |
| 6,716,513 | B1 * | 4/2004 | Hasuo | C03C 17/23 428/141 |
| 6,866,883 | B2 * | 3/2005 | Wang | G11B 5/73921 427/129 |
| 6,897,414 | B2 * | 5/2005 | Ito | H05B 3/265 219/444.1 |
| 6,967,312 | B2 * | 11/2005 | Hiramatsu | H01L 21/67103 219/444.1 |
| 7,553,519 | B2 * | 6/2009 | Florent | C03C 17/007 219/452.11 |
| 7,683,293 | B2 * | 3/2010 | Buzzi | C23C 30/00 219/452.11 |
| 8,137,751 | B2 * | 3/2012 | Bhushan | B05D 7/02 427/265 |
| 8,259,299 | B2 * | 9/2012 | Harra | A61B 5/0507 356/437 |
| 8,329,302 | B2 * | 12/2012 | Esemann | B44C 3/02 428/432 |
| 8,870,396 | B2 * | 10/2014 | Kaller | C03C 3/06 359/838 |
| 8,999,445 | B2 * | 4/2015 | Henze | C03C 17/3686 427/266 |
| 2002/0011481 | A1 * | 1/2002 | Melson | C03C 10/0027 219/452.11 |
| 2002/0025409 | A1 * | 2/2002 | Natsuhara | G03G 15/2053 428/141 |
| 2002/0145134 | A1 * | 10/2002 | Olding | C04B 41/4537 252/500 |
| 2003/0038129 | A1 * | 2/2003 | Hiramatsu | H01L 21/67103 219/444.1 |
| 2003/0102299 | A1 * | 6/2003 | Ito | H05B 3/265 219/444.1 |
| 2003/0152780 | A1 * | 8/2003 | Baumann | C04B 41/89 428/429 |
| 2004/0038081 | A1 * | 2/2004 | Wang | G11B 5/8404 428/848.2 |
| 2004/0091642 | A1 * | 5/2004 | Murakami | G02B 5/0215 428/1.31 |
| 2004/0191575 | A1 * | 9/2004 | Kurataka | G11B 5/74 428/848.1 |
| 2005/0008863 | A1 * | 1/2005 | Mimura | G02B 1/11 428/409 |
| 2005/0170098 | A1 * | 8/2005 | Baumann | C04B 41/52 427/372.2 |
| 2005/0205548 | A1 * | 9/2005 | Olding | H05B 3/68 219/461.1 |
| 2005/0214521 | A1 * | 9/2005 | Florent | C03C 17/007 428/323 |
| 2005/0269310 | A1 * | 12/2005 | Buzzi | C23C 16/0272 219/452.11 |
| 2006/0063024 | A1 * | 3/2006 | Natsuhara | C23C 4/12 428/621 |
| 2006/0088692 | A1 * | 4/2006 | Ito | C04B 35/645 428/141 |
| 2006/0292345 | A1 * | 12/2006 | Dave | C03C 17/3417 428/141 |
| 2007/0110958 | A1 * | 5/2007 | Meyers | B41J 2/01 428/141 |
| 2007/0195419 | A1 * | 8/2007 | Tsuda | C03C 17/007 359/601 |
| 2007/0228033 | A1 * | 10/2007 | Lee | H01C 17/06586 219/543 |
| 2008/0193721 | A1 * | 8/2008 | Ukelis | C04B 41/52 428/173 |
| 2008/0224937 | A1 * | 9/2008 | Kimura | H01F 1/344 343/787 |
| 2008/0274332 | A1 * | 11/2008 | Satou | G11B 7/24047 428/141 |
| 2009/0041984 | A1 * | 2/2009 | Mayers | G02B 1/18 428/141 |
| 2009/0053511 | A1 * | 2/2009 | Kim | B32B 17/10761 428/332 |
| 2009/0197048 | A1 * | 8/2009 | Amin | C03C 17/30 428/142 |
| 2009/0233082 | A1 * | 9/2009 | Esemann | C03C 17/007 428/319.1 |
| 2009/0263153 | A1 * | 10/2009 | Uenda | B08B 7/0028 399/101 |
| 2010/0028629 | A1 * | 2/2010 | Anton | C03C 1/008 428/201 |
| 2010/0033818 | A1 * | 2/2010 | Petcavich | B08B 17/06 359/507 |
| 2010/0047521 | A1 * | 2/2010 | Amin | C03C 3/087 428/141 |
| 2010/0047556 | A1 * | 2/2010 | Bockmeyer | C03C 17/007 428/324 |
| 2010/0175621 | A1 * | 7/2010 | Yamazaki | H01J 37/32192 118/723 AN |
| 2010/0177384 | A1 * | 7/2010 | Peroz | H05B 33/22 359/485.01 |
| 2010/0279068 | A1 * | 11/2010 | Cook | C03B 23/26 428/141 |
| 2010/0285275 | A1 * | 11/2010 | Baca | C03C 3/091 428/141 |
| 2010/0291346 | A1 * | 11/2010 | Hawtof | C03B 19/1407 428/141 |
| 2010/0304086 | A1 * | 12/2010 | Carre | C03C 17/245 428/149 |
| 2011/0111194 | A1 * | 5/2011 | Carre | H01L 21/68757 428/215 |
| 2011/0151186 | A1 * | 6/2011 | Lambourne | C09D 183/08 428/141 |
| 2011/0164297 | A1 * | 7/2011 | Abe | C23C 14/0015 359/227 |
| 2011/0217470 | A1 * | 9/2011 | Kosanovic | C04B 41/4922 427/384 |
| 2012/0003426 | A1 * | 1/2012 | Ying | B32B 27/32 428/141 |
| 2012/0015195 | A1 * | 1/2012 | Wang | C03C 15/00 428/426 |
| 2012/0015196 | A1 * | 1/2012 | Wang | C03C 17/3441 428/428 |
| 2012/0040160 | A1 * | 2/2012 | Wang | C03C 17/22 428/213 |
| 2012/0058300 | A1 * | 3/2012 | Finn | G03G 15/2057 428/141 |
| 2012/0094081 | A1 * | 4/2012 | Kelly | G03G 15/2057 428/172 |

(56) References Cited

U.S. PATENT DOCUMENTS

| | | | |
|---|---|---|---|
| 2012/0154811 A1* | 6/2012 | Pokorny | C08F 220/24 356/432 |
| 2012/0171416 A1* | 7/2012 | Chang | C23C 14/0057 428/141 |
| 2012/0171419 A1* | 7/2012 | Russell | B82Y 30/00 428/141 |
| 2012/0270980 A1* | 10/2012 | Pokorny | C09D 4/06 524/317 |
| 2012/0295081 A1* | 11/2012 | Henze | C03C 1/008 428/201 |
| 2013/0029097 A1* | 1/2013 | Chen | C23C 28/30 428/141 |
| 2013/0040116 A1* | 2/2013 | Henze | C03C 17/3686 428/201 |
| 2013/0052414 A1* | 2/2013 | Dobbins | C03B 17/065 428/141 |
| 2013/0120863 A1* | 5/2013 | Kaller | C03B 19/09 359/838 |
| 2013/0142994 A1* | 6/2013 | Wang | C03C 17/256 428/141 |
| 2013/0183487 A1* | 7/2013 | Henze | C03C 17/3607 428/141 |
| 2013/0216778 A1* | 8/2013 | Yoshida | C09J 7/38 428/141 |
| 2013/0236645 A1* | 9/2013 | Chang | B05D 3/00 427/299 |
| 2013/0273320 A1* | 10/2013 | Bockmeyer | C03C 3/093 428/147 |
| 2013/0309448 A1* | 11/2013 | Striegler | C08G 18/8074 428/141 |
| 2014/0291313 A1* | 10/2014 | Dufour | C03C 17/34 219/460.1 |

OTHER PUBLICATIONS

International Search Report dated Nov. 26, 2013, in PCT/FR2013/051419, filed Jun. 18, 2013.

\* cited by examiner

GLASS-CERAMIC ARTICLE AND MANUFACTURING PROCESS

STATEMENT REGARDING FEDERALLY SPONSORED RESEARCH OR DEVELOPMENT

Not applicable.

CROSS-REFERENCE TO RELATED APPLICATIONS

The present application is a 35 U.S.C. § 371 National Stage patent application of International patent application PCT/FR2013/051419, filed on Jun. 18, 2013, which claims priority to French patent application FR 12 55823, filed on Jun. 21, 2012.

THE NAMES OF THE PARTIES TO A JOINT RESEARCH AGREEMENT

Not applicable.

INCORPORATION-BY-REFERENCE OF THE MATERIAL ON THE COMPACT DISC

Not applicable.

BACKGROUND OF THE INVENTION

Field of the Invention

The present invention relates to the field of glass-ceramics. More specifically, it relates to a glass-ceramic article (or product), in particular a glass-ceramic plate, intended in particular to cover or receive heating elements, said article exhibiting at least one shaped region, in order to avoid in particular the appearance of finger marks, and also relates to an advantageous process which makes it possible to obtain said shaped glass-ceramic article.

Description of the related art including information disclosed under 37 CFR 1.97 and 1.98

The sales of articles, such as cooktops, made of glass-ceramic have been continually increasing for several years. This success is explained in particular by the attractive appearance of these plates and by their ease of cleaning.

It should be remembered that a glass-ceramic is originally a glass, referred to as precursor glass (or green glass), the specific chemical composition of which makes it possible to bring about, by suitable heat treatments, referred to as ceramization treatments, a controlled crystallization. This specific structure, in part crystallized, confers unique properties on the glass-ceramic.

There currently exists different types of plates made of glass-ceramic, each variant being the result of significant studies and of numerous tests, given that it is very problematic to carry out modifications on these plates and/or on their production process without risking an unfavorable effect on the desired properties: in order to be able to be used as cooktop, a glass-ceramic plate generally has to exhibit a transmittance in the wavelengths of the visible region which is simultaneously sufficiently low to conceal at least a portion of the underlying heating elements at rest and sufficiently high for the user, as the case may be (radiant heating, induction heating, and the like), to be able to visually detect the heating elements in the operating state for the purpose of safety; it should also exhibit a high transmittance in the wavelengths of the infrared region in the case in particular of plates having radiant heat sources.

The current main plates are dark in color, in particular black (such as the KERABLACK glass-ceramics sold by EuroKera). Other plates also exist, such as plates with a lighter appearance (in particular white plates, such as the KERAWHITE glass-ceramics sold by EuroKera), for example exhibiting a haze of at least 50% (as described in patent FR 2 766 816), or more transparent plates (such as the KERAVISION or KERARESIN glass-ceramics sold by EuroKera), exhibiting, if appropriate, coatings of enamel or paint type.

The plates are generally intended to be used as cooktops (or also as fireguards, and the like) and include, if appropriate, a portion (or control panel) equipped with keys, tactile zones, buttons or other controls which make it possible, if appropriate, to activate heating zones or to choose parameters, such as the cooking times. The use of these plates and their handling or the handling of these controls generally results in the appearance of rather unattractive finger marks at the contact points, if need be resulting in repeated cleaning, in particular when the plates are dark and shiny.

BRIEF SUMMARY OF THE INVENTION

The present invention has thus tried to develop an article formed of a glass-ceramic substrate (in particular a plate) not exhibiting such disadvantages in their daily use and their handling.

This aim has been achieved by the article according to the invention, comprising at least one glass-ceramic substrate (in particular a plate, intended, for example, to cover or receive at least one heating element), said substrate exhibiting, in at least one zone (or region or area), a surface roughness (or structuring or texturing) such that the characteristic dimensions of the patterns forming said roughness are between 2 and 100 µm. Characteristic dimensions is understood to mean the height/depth (H) of the patterns (or greater dimension of each of the patterns perpendicular to the (tangent to the) rough surface at the place of the pattern under consideration) and the characteristic dimensions of each of the patterns in the plane of the rough surface (the rough surface being considered laid flat). Characteristic dimensions of each of the patterns (or motifs or designs) in the plane of the rough surface is understood to mean those of the projection (along the perpendicular to the (tangent to the) rough surface) of the patterns onto the rough surface (or those of the greater section of the pattern in a plane parallel to that of the rough surface—referred to as "greater longitudinal section"), namely the greater dimension of this projection or section (or length L), and the dimension of this projection or section in a direction perpendicular to this direction L (or width W, it being possible for this width also to be equal to the length L and to correspond to the diameter in the case of a circular section). More specifically, according to the invention, the periphery (or the outlines) of this projection or greater section of each of the patterns falls (or is present) between two concentric circles, one having a diameter of 2 µm and the other having a diameter of 100 µm.

DETAILED DESCRIPTION OF THE INVENTION

Figure 1A:
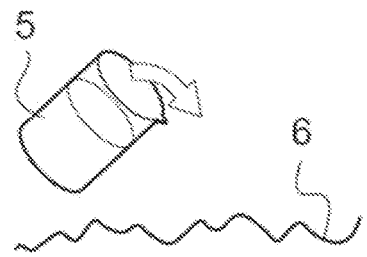
FIG. 1A: Preparation of a mask by pouring liquid PDMS (polydimethylsiloxane) 5 on a rough surface (target roughness) 6 of a glass.
Figure 1B:
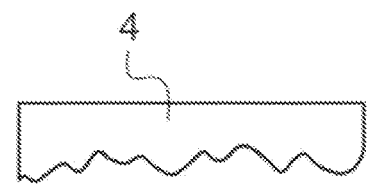
FIG. 1B: A flexible mask 4 made of PDMS with the negative of the desired target roughness produced from the embodiment in FIG. 1A.
Figure 1C:
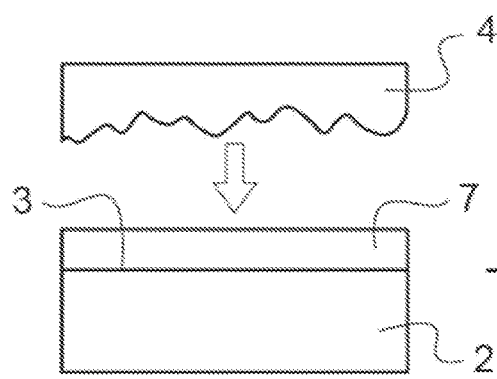
FIG. 1C: Coating a sol-gel thin layer (or film) 7 having a thickness of between 1 and 5 μm on a glass-ceramic substrate 2 having a display zone 3 by centrifuging and applying the PDMS mask 4 to the sol-gel layer 7.
Figure 1D:
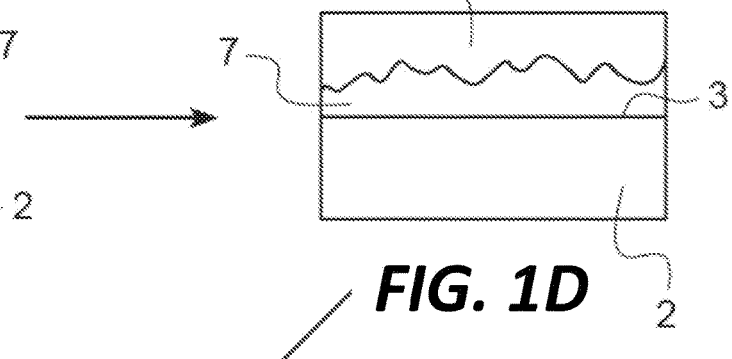
FIG. 1D: Filling the cavities of the mask 4 while heating and applying pressure.
Figure 1E:
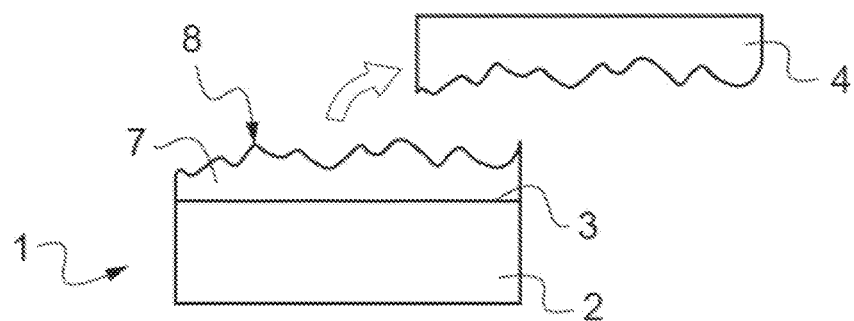
FIG. 1E: Separating the mask 4 and the structured product 1, which is a flat cooking module in this embodiment, to obtain a sol-gel thin layer 7 provided with a surface roughness 8 in which the characteristic dimensions of patterns forming said roughness are between 2 and 100 μm.
Figure 2A:
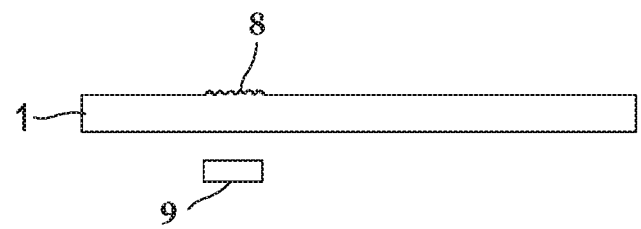
FIG. 2A: An embodiment showing an article that includes a glass-ceramic substrate 2 provided with the surface roughness 8 and a heating element.
Figure 2B:
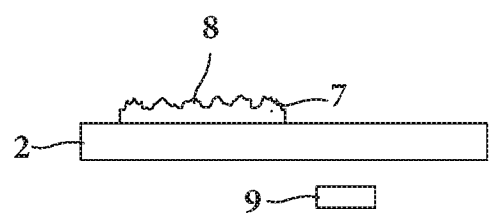
FIG. 2B: An alternate embodiment showing an article that includes a glass-ceramic substrate 2 provided with the surface roughness 8 in the form of a sol-gel layer 7 and a heating element 8.
Figure 3:
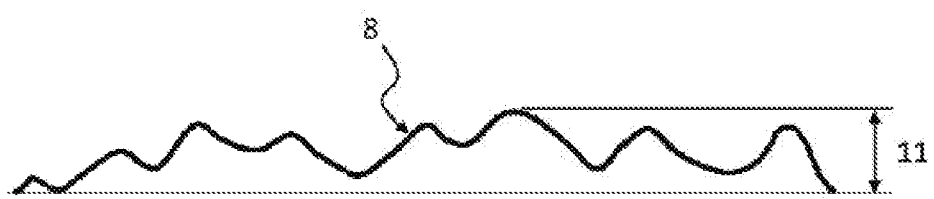
FIG. 3: A side-view of the surface roughness 8 formed of a network of patterns having a height 11 of between 2 and 50 μm.
Figure 4A:
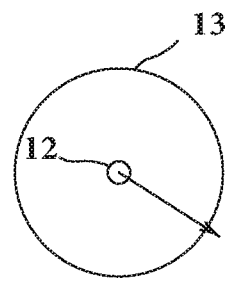
FIG. 4A: A top-view illustrating two concentric circles, one having a diameter of 2 μm 12 and the other having a diameter of 100 um 13, which encompasses the geometrical patterns 8, as shown in FIG. 4B.
Figure 4B:
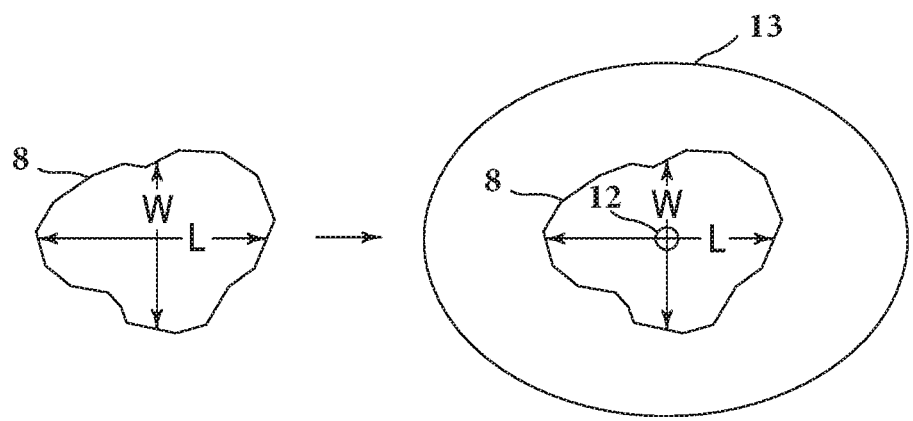
FIG. 4B: A top-view of an embodiment according to the invention in which the roughness is formed of a network of patterns 8, the periphery of the greater longitudinal section L, W of each of the patterns falling between the concentric circle having a diameter of 2 μm 12 and the concentric circle having a diameter of 100 μm 13 from FIG. 4A.

Preferably, the height H is between 2 and 50 μm and is particularly preferably between 2 and 15 μm. The length L and the width W are each between 2 and 100 μm.

The spacing (s) between each of the patterns is in addition advantageously less than or equal to 50 μm, preferably less than or equal to 30 μm and in particular less than or equal to 20 μm, this spacing becoming smaller in proportion as the characteristic dimensions of the patterns in the plane of the rough surface become greater.

The zone or zones provided with the roughness thus defined can, for example, be the zone or zones of the control panel for a cooktop.

The creation of such a surface structuring (or surface structuring/porosity, or structuring/porosity at the surface of the substrate) of specific dimensions as defined makes it possible to effectively solve the problem of marks for glass-ceramics (other means, such as resorting to an oleophobic treatment, having been proved in particular to be inadequate and relatively short-lived for dark plates) without changing the composition of the plate or its volume properties and without risks of decomposition under the effect of heat or unfavorable effects on the other desired properties of the plate. It is thus observed that the deposit left by contact of the fingers (oily deposit or sebum, with a thickness generally not exceeding 500 nm, with grooves with a width not exceeding approximately a hundred microns) does not completely fill the patterns of the roughness, not resulting in the appearance of marks. The patterns selected in addition do not detrimentally affect the light transmittance of the substrate or its general appearance.

The roughness or structuring is generally formed of several patterns, identical or optionally different, in particular of a repetition of pattern(s). The patterns can be hollowed out and/or in relief (with respect to the plane or to the surface of the substrate), evenly distributed (periodic, pseudoperiodic or quasiperiodic distribution) or randomly distributed (the spacing between consecutive patterns remaining, however, less than or equal to 50 μm), can be aligned or offset, and the like. These generally geometrical patterns (or substantially geometrical patterns but which can also be of any or complex shape with a periphery following between two circles as mentioned above) are advantageously three-dimensional and have, for example, a circular, hexagonal, square, rectangular, oval, trapezoidal, elongated, and the like, "longitudinal" section (that is to say, parallel to the rough surface or to that of the substrate in the rough zone) and/or a rectangular, semicylindrical, trapezoidal, frustoconical and/or pyramidal and/or triangular, and the like, transverse section (perpendicular to the (tangent to the) rough surface or to that of the substrate in the rough zone). The roughness can in particular be formed of a network (or repetition), advantageously periodic, of patterns in the form, for example, of blocks of rectangular or pyramidal shape.

Different zones of the substrate can be structured with similar or distinct patterns. The roughness is present in at least one zone of at least one face of the substrate, in particular on the face intended to be the visible face (generally upper face) in a position of use of the substrate.

The characteristic dimensions of the patterns are of the order of a micron (preferably from 2 to several tens of microns or several microns in particular), as indicated according to the invention, the patterns generally exhibiting a periodicity (or a step) of between 5 and 100 μm. The patterns or the network of patterns preferably extend(s) over a surface area at least greater than or equal to 0.005 m² in order to produce the desired effect (the surface area of the control zone which can be provided with these patterns furthermore being generally of the order of 0.005-0.01 m²).

In a first preferred embodiment of the invention, the patterns have in particular a (substantially or specifically) square or rectangular longitudinal and/or transverse section, preferably with a height and a length/width each of between 2 and 15 μm, preferably between 2 and 10 μm approximately, in particular of the order of 5 μm, and a spacing, for example, of less than or equal to 50 μm, in particular of between 1 and 50 μm and especially of less than 30 μm.

In a second preferred embodiment of the invention, the patterns have in particular a (substantially or precisely) triangular or pyramidal transverse section, preferably with a height of less than 20 μm (and greater than 2 μm), a spacing of less than 30 μm and a base (of the pyramid) with a length/width of between 20 and 100 μm.

Preferably, the structuring is present (or practiced) not in the glass-ceramic substrate itself but in a layer carried (directly or not) by the glass-ceramic substrate, said layer coating the substrate in at least the zone which has to be structured and/or over a surface of the substrate including said zone, indeed even over the whole of the face or faces concerned (carrying the structuring) of the substrate.

The substrate thus exhibits (or presents or includes), in at least one zone of at least one face, at least one layer (or coating) exhibiting the roughness/structuring defined above.

This layer has simultaneously to be able to be applied to the glass-ceramic, be compatible with the conditions of use of said glass-ceramic (including the temperature) and be capable of being provided with the desired roughness (it has to be capable of being deformed before texturing and of remaining set afterwards). The layer coating the substrate is advantageously chosen transparent (before texturing, this layer advantageously retaining its transparency after texturing). This layer can be dense or also porous (with pores having smaller dimensions than the patterns). Advantageously, this layer or coating is a sol-gel layer (layer resulting from a sol-gel process) but it can also be a layer of a polymer which withstands the thermal conditions of the zone concerned (for example a PMMA (polymethyl methacrylate) layer if it is located in a zone other than a heating zone).

Preferably, use is made of a sol-gel layer, this layer being obtained by a sol-gel process from inorganic precursors. Such a layer is sufficiently flexible to fit the outlines, possibly uneven, of the glass-ceramic, makes possible good adhesion with the glass-ceramic and is capable of returning to the viscous state after deposition on the glass-ceramic, as clarified subsequently, in order to be structured, as described in the process according to the invention, before definitively setting. This sol-gel layer, which is inorganic, is also compatible, if appropriate, with the ceramization process used to obtain the glass-ceramic substrate.

Many chemical elements can form the basis of the sol-gel layer. It can in particular comprise (as essential constituent material) at least one compound (oxide(s), simple or mixed, alkoxide(s), halide(s), and the like) of at least one of the following elements: Si, Ti, Zr, W, Sb, Hf, Ta, V, Mg, Al, Mn, Co, Ni, Sn, Zn or Ce. Generally, this layer is a layer of hydrolyzed sol based on alkoxide(s) and/or on halide(s) of at least one metal chosen from the abovementioned elements, with a nonreactive or nonhydrolyzable organic group (for example one or more methyl groups) making it possible, if appropriate, to retain a degree of flexibility of the layer of use in its deposition on the surface of the glass-ceramic (in order to perfectly match the outlines of said surface) and being able to be removed after curing the layer.

The precursors of the sol-gel layer can also comprise other components, such as colorants and/or surfactants (improving, if need be, the deposit quality) and/or pore-forming agents (of the polystyrene or PMMA latex type), and the like, which, for some, are optionally intended to be removed before preparation of the final layer.

Preferably, the layer is essentially based on at least one of the following compounds: Si (for its adhesion and its compatibility with the glass-ceramic) or Ti or Zr. The sol (or solution, in particular in water or alcohol, of the precursors of the sol-gel layer to be obtained) is, for example, a silicon alkoxide with a linear, branched or cyclic, or aromatic, organic group (such as a methyl, vinyl, phenyl, and the like). In particular, use is made of MTEOS (methyl triethoxysilane), an organosilane having three hydrolyzable groups and having a methyl as the organic part, easily making it possible to produce layers of a few microns. The synthesis of the sol based on this compound is in addition extremely simple since it is carried out in a single stage (dissolution of the precursors in water or in at least one alcohol in particular) and does not necessarily require heating. Furthermore, the sol prepared is stable and can be stored for several days without gelling.

Preferably, the thickness of the layer is between 1 and 15 µm before structuring and is between 2 and 30 µm (it is also possible to refer to thin layer or film) after structuring (the material being redivided, if appropriate, in particular in the case of sol-gel layers).

In addition to the structuring, this layer can also exhibit other characteristics or functionalities, for example can advantageously be hydrophobic, oleophobic or hydrophilic, and the like.

The article according to the invention is in particular a cooktop but can also be any other article made of glass-ceramic exhibiting, for example, a functional or decorative display and intended to be subjected to handling and/or maintenance operations.

Glass-ceramic articles/substrates/plates (articles/substrates/plates made of glass-ceramic) is understood to mean not only the articles/substrates/plates made of glass-ceramic proper but can also be understood to mean those made of any other similar material suitable for the same applications, in particular which are resistant to high temperature and/or which exhibit a zero or virtually zero coefficient of expansion (for example, of less than $15 \times 10^{-7}$ $K^{-1}$, such as for glass-ceramic plates used with radiant heat sources). However, preferably, it is an article/substrate/plate made of glass-ceramic proper.

Preferably, the article according to the invention is formed of a glass-ceramic plate (substrate) which is predominantly or virtually flat (in particular with a deflection of less than 0.1% of the diagonal of the plate and preferably of the order of zero) and, as indicated above, is intended to act as cooktop, for example incorporated in a cooking surface or kitchen range, said surface or kitchen range additionally comprising heating elements, such as radiant or halogen heat sources or induction heating elements.

The plate generally exhibits an "upper" face (visible face) in the position of use, another "lower" face (often hidden, in the framework or casing of a kitchen range, for example) in the position of use, and a section (or edge or thickness). The upper face is generally flat and smooth but can also exhibit (in relation to the roughness in at least one zone as defined above) at least one (other) zone in relief and/or hollowed out and/or at least one opening (for example if the plate incorporates an opening intended to receive an atmospheric gas burner) which is(are) generally functional (having signaling purposes or for specific uses of the plate), the surface variations, apart from, if appropriate, these zones and openings and the textured zones according to the invention, generally remaining less than a few nm. The lower face is generally smooth or equipped with burrs (of the order of 1 to a few mm) which increase its mechanical strength and are conventionally obtained by rolling. In the case of the burrs, an index resin can optionally be applied to the lower surface in order to smoothen it.

The article according to the invention is advantageously based on any glass-ceramic intrinsically having a light transmittance ranging from 0.8% to 40% and an optical transmittance of at least 0.1% for at least one wavelength included in the visible region above 420 nm (and up to 780 nm). The term "intrinsically" is understood to mean that the substrate has such a transmittance in itself, without coating(s). The light transmittance is measured according to standard ISO 9050:2003 using the D65 illuminant and is the total transmittance (integrated in the visible region), taking into account both the direct transmittance and possible diffuse transmittance, the invention being carried out, for example, using a spectrophotometer equipped with an integrating sphere, the measurement at a given thickness subsequently being converted, if appropriate, to the reference thickness of 4 mm according to standard ISO 9050:2003.

The invention is suitable for dark, clear or colored glass-ceramic plates. In the case of a plate with a light transmittance ranging from 2.3% to 40% and with an optical transmittance of at least 0.6% for at least one wavelength within the range extending from 420 to 480 nm, the glass-ceramic preferably exhibits at least one masking means intended to mask at least a portion of the associated underlying elements (heating means in particular) in the form, if appropriate, of one or more additional coatings (generally located on the lower face of the plate) in addition to the structured coating according to the invention (generally located on the upper face of the plate for the purposes of preventing finger marks).

The invention applies particularly advantageously to dark plates (in particular such that the L* value in the CIE colorimetric system, calculated from the transmittance spectrum of said glass-ceramic over the visible region, is less than 70%) exhibiting in particular a light transmittance in the visible region of 0.8% to 5% and an optical transmittance of greater than 0.1% for at least one wavelength within the visible region of greater than 450 nm.

The glass-ceramic used comprises, for example, the following constituents and/or is obtained by ceramization starting from a glass with the following composition, within the limits expressed below in percentages by weight: $SiO_2$: 52-75%; $Al_2O_3$: 18-27%; $Li_2O$: 2.5-5.5%; $K_2O$: 0-3%; $Na_2O$: 0-3%; $ZnO$: 0-3.5%; $MgO$: 0-3%; $CaO$: 0-2.5%; $BaO$: 0-3.5; $SrO$: 0-2%; $TiO_2$: 1.2-5.5%; $ZrO_2$: 0-3%; $P_2O_5$: 0-8%. It can also comprise up to 1% by weight of nonessential constituents not affecting the melting of the green glass or the subsequent devitrification resulting in the glass-ceramic, in particular colorants, such as vanadium oxide, and the like.

The article according to the invention can also comprise various functional and/or decorative coatings, based on enamel, on paint, and the like. For example, one of the faces of the substrate can comprise a layer of enamel for decoration, for masking or for another function (homogenization of the lighting, and the like). The structured layer according to the invention can cover, if appropriate, at least in part, one or more of the other coatings present (masking, functional and/or decorative) and/or one and/or other of said coatings can occur, if appropriate, on the opposite face (in particular lower face) of the substrate.

Likewise, the article according to the invention can comprise other components and/or layers than the abovementioned constituents. For example, when it is a cooking module, the article can be equipped with (or combined with) additional functional or decorative element(s) (frame, connector(s), cable(s), control element(s)), and the like. It can also comprise one or more light sources, one or more waveguides, one or more means for extraction of the radiation emitted by the source or sources (added layers or diffusing treatment(s) obtained, for example, by laser etching, printing with enamel, chemical attack (acid, and the like) or mechanical attack (sandblasting, and the like), and the like), one or more display devices (the display being seen through the substrate), and the like. The article also generally comprises means for controlling and/or commanding the associated heating elements.

The invention also relates to appliances (or devices) for cooking and/or maintaining at high temperature comprising at least (or consisting of) one article according to the invention (for example kitchen ranges, set-in cooking surfaces, ovens, and the like) and comprising, if appropriate, one or more heating elements, such as one or more radiant or halogen elements and/or one or more atmospheric gas burners and/or one or more induction heating means. The invention encompasses both cooking appliances comprising just one plate and appliances comprising several plates, each of these plates having, if appropriate, a single heat source or multiple heat sources. The term "heat source" is understood to mean a cooking location. The invention also relates to hybrid cooking appliances, the cooking plate or plates of which comprise several types of heat sources (gas heat sources, radiant, halogen or induction heat sources). In addition, the invention is not limited to the manufacture of plates or cooking modules for kitchen ranges or cooking surfaces. The articles manufactured in accordance with the invention can also be other flat modules or plates which have to exhibit high insensitivity to temperature variations.

The present invention also relates to a process for producing the article as defined. This is because the present invention has developed a process for the manufacture of the article according to the invention according to which the desired roughness (between 2 and 100 µm) on the substrate, more specifically on the layer to be structured deposited at the surface of the substrate, is obtained by duplication (or replication or transfer) of a target roughness (or patterns of chosen characteristic dimensions) using a pad or mask molded to the outlines of said target roughness. The process according to the invention makes possible the efficient transfer of a pattern with the desired dimensions (2 µm to 100 µm) to the layer to be structured applied to the glass-ceramic substrate and can even be generalized to the transfer of roughnesses exhibiting other functional or esthetic dimensions, as specified subsequently.

For the record, the manufacture of glass-ceramic plates is generally carried out as follows: the glass with the composition chosen in order to form the glass-ceramic is melted in a melting furnace, the molten glass is then rolled into a standard ribbon or sheet by causing the molten glass to pass between rolling rolls and the glass ribbon is cut to the desired dimensions. The plates, thus cut, are subsequently ceramized in a way known per se, the ceramization consisting in firing the plates according to the thermal profile chosen in order to convert the glass into the polycrystalline material known as "glass-ceramic", the coefficient of expansion of which is zero or virtually zero and which withstands a thermal shock which can range up to 700° C. The ceramization generally comprises a stage in which the temperature is gradually raised up to the nucleation range, generally located in the vicinity of the range of transformation of the glass, a stage of passing through the nucleation interval in several minutes, a further gradual rise in the temperature up to the temperature of the ceramization stationary phase, the maintenance of the temperature of the ceramization stationary phase for several minutes and then a rapid cooling down to ambient temperature. If appropriate, the process also comprises a cutting operation (generally before ceramization), for example using a jet of water, mechanical marking using a cutting wheel, and the like, followed by a fashioning operation (grinding, beveling, and the like).

In the process according to the invention, a layer capable of being deformed (or which can be structured) is deposited on the glass-ceramic substrate (after or optionally before, depending on the type of layer, ceramization of the precursor glass (or green grass) which makes it possible to obtain said substrate), then the structured face of a pad or mask, molded beforehand to the outlines of the desired roughness (or target roughness), as clarified subsequently, is applied to the layer capable of being deformed and said roughness is transferred, in particular under hot conditions and under pressure, onto (or duplicated, in particular under hot conditions and under pressure, on) said layer which can be structured (or deformed).

The formation of the mask with the chosen outlines and then the duplication on the layer capable of being deformed make it possible to obtain the desired roughness on the substrate according to the invention. This roughness, with a depth of the order of a micron, cannot in fact be obtained by other shaping processes used for reliefs having greater dimensions in the field of glass-ceramics, such as rolling. Other processes which make it possible to obtain reliefs of a few millimeters, such as laser etching or chemical attack, are not suitable either for obtaining the product according to the invention, just as processes from other fields, such as lithographic techniques (used in electronics) are not suitable for glass-ceramics and for the manufacture of mass products due to their high cost, their slowness, their complexity (several stages), and the like.

As indicated above, the layer capable of being deformed is advantageously a sol-gel layer capable of returning to the viscous/deformable state under a certain temperature (above the glass transition temperature) and thus of being structured as desired according to the invention. As mentioned above, this layer is, for example, a layer of hydrolyzed sol based on alkoxide(s) and/or halide(s) of at least one metal chosen from Si, Ti, Zr, W, Sb, Hf, Ta, V, Mg, Al, Mn, Co, Ni, Sn, Zn or Ce with a nonreactive organic group which makes it possible, if appropriate, to retain a degree of flexibility.

The deposition of this layer on the substrate can be carried out in different ways, in particular by the liquid route (especially by deposition of the sol), such as deposition by centrifuging the sol (spin coating), deposition by dipping in the sol (dip coating) or spraying the sol (spray coating), followed, if appropriate, by the spreading of the drops by scraping, brushing, heating, and the like, or else can be carried out by laminar coating (deposition of the sol using an opening which moves above the substrate). The deposition can be followed, if appropriate, by a stage of drying the sol (in particular at less than 100° C.) in order to evaporate the solvent and fix the layer, without, however, removing its ability to undergo a subsequent structuring. It is important to control the conditions for preparation of the sol-gel solution so that the layer remains deformable during the process (for example, it is necessary to avoid any heating which can cause the layer to irreversibly polymerize). The deposition can be carried out over a portion of the substrate (for example over the control panel) or over the whole of a face in particular.

In accordance with the present invention, the target roughness is advantageously obtained from a pre-existing roughness present on another surface or on another product.

Use is advantageously made of a mask (or pad) based on a material which is both sturdy and flexible, such as a polymeric material, in particular of elastomer type, for example PDMS (polydimethylsiloxane) or VDMS (vinyldimethylsiloxane), or EVA (vinyl acetate/ethylene) or epoxy or a copolymer), this material optionally being surface-treated (for example with a layer of fluorosilane and/or TMCS (trichloromethylsiloxane) in order to develop a non-stick surface (this non-stick layer not exceeding a few nanometers in thickness and thus not modifying the patterns by filling in the cavities of the mask, this layer making it possible in particular to use the mask several times), the use of a flexible mask exhibiting the advantage of keeping to the surface of the substrate, of minimizing the pressure required in order to establish contact with the layer to be structured and of being able to conform, during the production thereof, to the desired surface roughness. Such a mask (in particular made of PDMS) also exhibits the advantage of increasing the kinetics of sol-gel condensation with better evaporation of possible solvent, in comparison with hard molds (for example made of silicon or of nickel).

The mask is, for example, obtained by applying the polymer material or its precursors to or by pouring the polymer material or its precursors over a solid surface exhibiting the target roughness and by then fixing the mask, if appropriate by cooling, heating (for example up to 80° C.) and/or crosslinking, in order to obtain the mask having the desired set profile. In particular, the liquid polymer can be brought above its melting point or its glass transition temperature and then cooled, or the mask made of polymer can be obtained by mixing and pouring two monomers which react together (and which are then set) at ambient temperature or by heating, or a polymer film can be applied to the target surface and then heated above its melting point or its glass transition temperature and pressurized, then set by cooling, and the like.

The target roughness surface used can be any surface of a pre-existing object or can be a surface created, for example, by sandblasting on a roll and printed by rolling over a plastic film beforehand (addition to the elastomer pad). The process is in particular compatible with the use of inexpensive masks formed by textured polymer sheets produced by roll-to-roll. It is thus possible to duplicate any rough surface having dimensions desired for the article according to the invention without having to prepare a metal or composite mold or other expensive device for this purpose. The method according to the invention can also be used with advantage to functionalize and/or confer a specific esthetic appearance on the glass-ceramic by duplicating appropriate surfaces in order to confer the desired function or the desired esthetic quality in a simple way and without investing in expensive equipment. The process according to the invention thus makes it possible to obtain the desired product according to the invention but also, by extension, other glass-ceramic products exhibiting a different functional and/or esthetic roughness, in particular a roughness of less than 100 µm (that is to say, with its characteristic dimensions of less than 100 µm).

The pattern created on the mask is generally the negative of the pattern to be duplicated or of a portion of the pattern to be duplicated. The final pattern can, if appropriate, be formed with several masks (identical or different) or by several passes. It is also possible to use several sub-masks which are small in size in order to form a mask which is large in size, which facilitates the manufacture thereof and gives more flexibility (change of one of the masks, if necessary, in the event of wear, defects, and the like). The surface of the layer deposited on the glass-ceramic can also be structured several times, preferably continuously, using masks which can be similar or distinct. The mask can also exhibit several zones with patterns distinct by their size, their distance, and the like. As already indicated above, the patterns obtained may not exhibit perfect geometrical shapes. In the case of sharp-angled patterns, the pattern can also, if appropriate, become rounded without harming the performance required.

The mask is, for example, used flat to structure the layer (it is then combined, if appropriate, with a flat press) or can also be used curved and/or combined with a rotating means (such as a cylinder, and the like).

The structuring of (or duplication of the patterns on) the layer which can be structured deposited on the glass-ceramic is carried out by application of the mask by viscoelastic deformation by contact with the structured mask under hot conditions and while exerting a pressure, and optionally by capillary filling of the structured flexible mask. The structuring is carried out in a temperature range suitable for a sufficient condensation threshold ensuring the thermal resistance of the structuring, with an associated structuring time (generally less than or equal to 2 hours, preferably less than or equal to 1 hour, more preferably still less than or equal to 30 minutes) which generally becomes shorter as the structuring temperature becomes higher.

The structuring begins from the moment when the mask sinks into the layer and ends with the withdrawal of the mask, either applied and withdrawn under hot conditions or after bringing down the temperature of the mask which has remained on the layer.

The heating during the structuring (external heating and/or heating of the actual pad) can be carried out by an infrared or halogen lamp or by heated fluid or a resistance, and the like. This heating (thermal, radiative, and the like) can be maintained over a portion of the contact phase or can be cut off, indeed even reversed (cooling), in order to stiffen the product. In order to limit the energy costs and/or deformation of the pad or mask made of polymer, a structuring temperature of less than or equal to 200° C., indeed even of less than or equal to 180° C., may be preferred. For example, the structuring can be carried out at a temperature between 100° C. and 130° C. for from 10 min to 30 min, or at a slightly higher temperature (in particular between 150° C. and 180° C.) for a shorter time (for example of less than or equal to 10 minutes). At the same time, the pad is generally itself heated after being brought into contact with the layer in order to promote the printing.

During the structuring, a pressure is also generally applied, for example a pressure of less than 5 bar, preferably less than 2 bar. Use may in particular and advantageously be made of a pressurized fluid in order to compress the mask or pad against the substrate, this making it possible to escape the limitations observed with the use of a mechanical press (such as defects in flatness which can lead to a variation in pressure resulting in a variation in the depth of the transferred patterns). This pressurized fluid can be applied using a pressurized chamber, a flexible membrane which retranscribes the pressure of the fluid, or also streams of fluid pressurized via openings positioned along the contact surface, and the like.

It is possible, for example, to introduce the substrate coated with the layer and the mask into a wrapping made of impermeable material, to place the assembly in an airtight chamber, to evacuate the air from the chamber (for example down to a pressure at most equal to 5 mbar), to seal the wrapping before reintroducing air into the chamber, to introduce the sealed wrapping and its contents into an autoclave, to apply a pressure (for example between 0.5 and 8 bar) under hot conditions (for example between 25 and 200° C.) for 15 minutes to several hours and to then open the wrapping and separate the structured substrate obtained and the mask, the sealing and the evacuation of the air being necessary in order to allow the pressure to be transmitted from the fluid to the pad. If appropriate, the textured face of the mask is permeable to air, thus preventing, during the sealing, the trapping of air bubbles between the coated substrate and the mask. The autoclave then can also be replaced, if appropriate, by simple stoving.

The parameters (temperature, pressure) can be adjusted as a function of the nature of the deformable layer, the objective being to compress the mask against the layer capable of being deformed while closing it in order to render it non-deformable. In this way, the pattern inscribed at the surface of the pad is impressed and set in the layer deposited at the surface of the substrate. The temperature in the autoclave can, if appropriate, be successively brought to a temperature greater than and then less than the glass transition temperature of the polymer material of the mask, or vice versa, in order to precisely control the mechanical behavior of the mask and to optimize the contact between the mask and the coated substrate.

The structuring is therefore advantageously carried out rapidly after the deposition of the layer (a few minutes to a few tens of minutes) and can be carried out in line after the deposition. This deposition can have been carried out before or after ceramization and is preferably carried out after ceramization.

The structuring can be followed by a stage of heat treatment or of treatment by ultraviolet radiation (in the case in particular where the layer comprises groups which can be polymerized under ultraviolet radiation) in order to densify the structured layer and to set (fix) said layer and, if appropriate, in order to remove the organic group(s), for example at a temperature of greater than 400° C. The layer can also be subjected to a further heat treatment in order to crystallize it, to improve its mechanical properties, to vary the hydrophilic/hydrophobic nature of its surface, and the like.

A layer (in particular an inorganic layer) which is structured (for example a silica layer), without cracks and with good preservation of the starting dimensions of the target, and also good mechanical strength, is thus obtained. The process makes it possible to achieve characteristic magnitudes of patterns of the order of a micron with a tolerance with regard to the texturing defects which does not harm the desired performance. It makes it possible to obtain a structured product which is long lasting and rapid to manufacture, with a texturing which is perfectly uniform in depth over a surface area which is greater or lesser according to requirements.

After the structuring, the product can also be subjected to various glassmaking transformations, including fashioning, as mentioned above. The process is suitable for the manufacture of large-volume and/or large-scale products. It can be easily automated and combined with other transformations of the product. It does not require specific equipment and is compatible with the devices commonly used in the glass-ceramic industry. In so far as the mask is not destroyed during the process, it can be reused several times.

The process makes it possible to broaden the range of glass-ceramic products available and makes it possible, if appropriate, to apply patterns having other purposes than the desired effect of preventing finger marks and/or conferring, if appropriate, a specific esthetic appearance on the surface of the glass-ceramic, the function and the properties associated with the structuring depending in particular on the characteristic dimensions, such as the height and the width, of the pattern and/or the inter-pattern distance.

The present invention also covers an article comprising a glass-ceramic substrate (having a structured layer) obtained by the process as described above.

The articles, in particular plates, according to the invention can in particular be used with advantage to produce a novel range of cooktops for kitchen ranges or cooking surfaces and can also be used with advantage to produce wall elements or walls (for example doors or parts of doors) of ovens, and the like.

Other advantageous characteristics and details will emerge below from the description of a nonlimiting embodiment of the invention with reference to the appended drawings, which diagrammatically represent, in side view, the stages of the process according to the invention.

In this embodiment of the article according to the invention, the article 1 in question is a flat cooking module comprising a glass-ceramic plate (substrate) 2, this plate exhibiting, for example, a smooth upper face and a smooth lower face (it being possible for this face also to be provided with burrs) and a thickness of 4 mm, and a display zone 3 for which the effect of preventing finger marks is desired.

In a first stage, a flexible mask 4 made of PDMS (polydimethylsiloxane) is produced which exhibits the desired profile.

This mask is obtained (stage a) in the present example by pouring the liquid PDMS 5 on to the rough surface (target roughness) 6 of a glass of the Satinovo brand sold by Saint-Gobain Glass France. After solidification at 80° C. for two hours and separation, the PDMS mask is treated by chemical vapor deposition of TMCS (trichloromethylsiloxane) in order to develop a non-stick surface (a ready-for-use mask is thus obtained, in stage b, exhibiting the negative of the desired target roughness).

At the same time, a sol-gel thin layer (or film) 7 is produced from an MTEOS (methyltriethoxysilane) sol hydrolyzed in an acidic medium. The sol is prepared, for example, from a methyltriethoxysilane/acetic acid mixture according to a 45/55 ratio by weight. The solution is subsequently left stirring at ambient temperature for 12 h. After complete hydrolysis of the ethoxy groups, the film, with a thickness of between 1 and 5 μm, is coated by centrifuging on the glass-ceramic substrate.

The PDMS mask is subsequently applied to the sol-gel layer (stage c), for example at low pressure (less than 1.5 bar), the cavities being filled by capillary action, heating and pressure (stage d). The low viscosity of the MTEOS promotes the filling of the cavities of the mask and also reduces the stresses of the consecutive annealing. The mask is advantageously heated, after bringing into contact with the sol-gel layer, at a temperature of 110° C. for a time of 30 min (the time for the rise up to said temperature varying between 3 min and 7 min, the structuring becoming faster as this rise becomes faster).

After gradually bringing the temperature down to ambient temperature, the mask and the structured product are separated (stage e). The mask can also be removed under hot conditions, for example at 80° C.

The roughness 8 produced exhibits the following characteristic dimensions (measured, for example, by an optical profilometer, such as that sold under the reference New View by Zygo, or else by a mechanical or contact profilometer, and the like): it is a network of blocks of approximately pyramidal shape, with a maximum height H of 10-13 μm and with a width W/length L between 30 and 50 μm, the spacing (s) between the blocks being zero (or close to zero) in this embodiment.

The patterns are printed with good homogeneity over several square centimeters (approximately 20 cm by 20 cm) and confirm the initial sizes of the target roughness (that of the starting Satinovo glass) transferred by the mask.

The heat treatment of the structured MTEOS layer takes place in an oven in order to densify the network and to obtain the complete oxidation and the complete decomposition of the methyl ($CH_3$) groups. The preservation of the patterns depends on the level of condensation of the film after structuring. With a sufficient level of condensation, the coating is sufficiently crosslinked to remain "solid" during the heating phase (whereas it can refluidify under the effect of the temperature if the degree of condensation is too low). As this degree of condensation increases with the temperature, the higher the temperature the shorter the time necessary in order to reach the condensation threshold. In the present example, the heat treatment is carried out at approximately 500° C. for two hours. The structural characteristics are retained after heat treatment and a structured coating of pure silica is obtained. The patterns are stable over time and are not damaged by conventional solvents.

Before the structuring, one or more other stages may have been provided, preferably continuously, such as the deposition of underlying layer(s), and, even further upstream, the formation of the glass-ceramic substrate. It is also possible to carry out a second structuring and/or other stages subsequent to the structuring.

The present invention is suitable in particular for the production of glass-ceramic cooktops exhibiting properties of preventing finger marks.

The invention claimed is:
1. An article, comprising:
a heating element; and
a glass-ceramic substrate,
wherein the substrate covers or receives the heating element,
wherein the substrate has, in at least one zone, a surface roughness such that characteristic dimensions of patterns forming the roughness are between 2 and 100 μm, and
wherein the glass-ceramic substrate comprises, by weight percent:
$SiO_2$: 52-75%;
$Al_2O_3$: 18-27%;
$Li_2O$: 2.5-5.5%;
$K_2O$: 0-3%;
$Na_2O$: 0-3%;
ZnO: 0-3.5%;
MgO: 0-3%;
CaO: 0-2.5%;
BaO: 0-3.5;
SrO: 0-2%;
$TiO_2$: 1.2-5.5%;
$ZrO_2$: 0-3%; and
$P_2O_5$: 0-8%.

2. The article as claimed in claim 1, wherein the roughness comprises a network of the patterns, a periphery of a greater longitudinal section of each of the patterns falling between two concentric circles, one circle of the concentric circles having a diameter of 2 μm and the other circle of the concentric circles having a diameter of 100 μm.

3. The article as claimed in claim 1, wherein a height of the patterns is between 2 and 50 μm and a spacing between each of the patterns is less than or equal to 50 μm.

4. The article as claimed in claim 1, wherein
the patterns have a square or rectangular longitudinal and/or transverse section, with a height, a length, and a width each of between 2 and 15 μm, and a spacing of less than or equal to 50 μm,
and/or
the patterns have a triangular or pyramidal transverse section, with a height of less than 20 μm and a spacing of less than 30 μm.

5. The article as claimed in claim 1, wherein the substrate comprises, in the zone of a face, a layer having the roughness.

6. The article as claimed in claim 5, wherein the layer is a sol-gel layer.

7. The article as claimed in claim 1, wherein the glass-ceramic substrate has a light transmittance ranging from 0.8% to 40% and an optical transmittance of at least 0.1% for at least one wavelength in the region from 420 nm to 780 nm.

8. The article as claimed in claim 7, wherein the glass-ceramic substrate has a light transmittance ranging from 2.3% to 40% and an optical transmittance of at least 0.6% for at least one wavelength in the region from 420 nm to 780 nm.

9. The article as claimed in claim 1, wherein the heating element is located under a lower face of the glass-ceramic substrate, and
   wherein the article further comprises a masking element located on the lower face of the glass-ceramic substrate, such that the masking element masks the heating element.

10. The article as claimed in claim 1, wherein the patterns have a square or rectangular longitudinal and/or transverse section, with a height, a length, and a width each of between 2 and 15 μm, and a spacing of less than or equal to 50 μm.

11. The article as claimed in claim 1, wherein the heating element is located under a lower face of the glass-ceramic substrate,
   wherein the substrate comprises, in a zone of an upper face of the glass-ceramic substrate, a layer having the surface roughness, and
   wherein the layer is an inorganic sol-gel layer.

* * * * *